Sept. 9, 1941.                D. H. ANNIN                2,255,639
                          CONDITION CONTROLLER
                            Filed Dec. 3, 1937
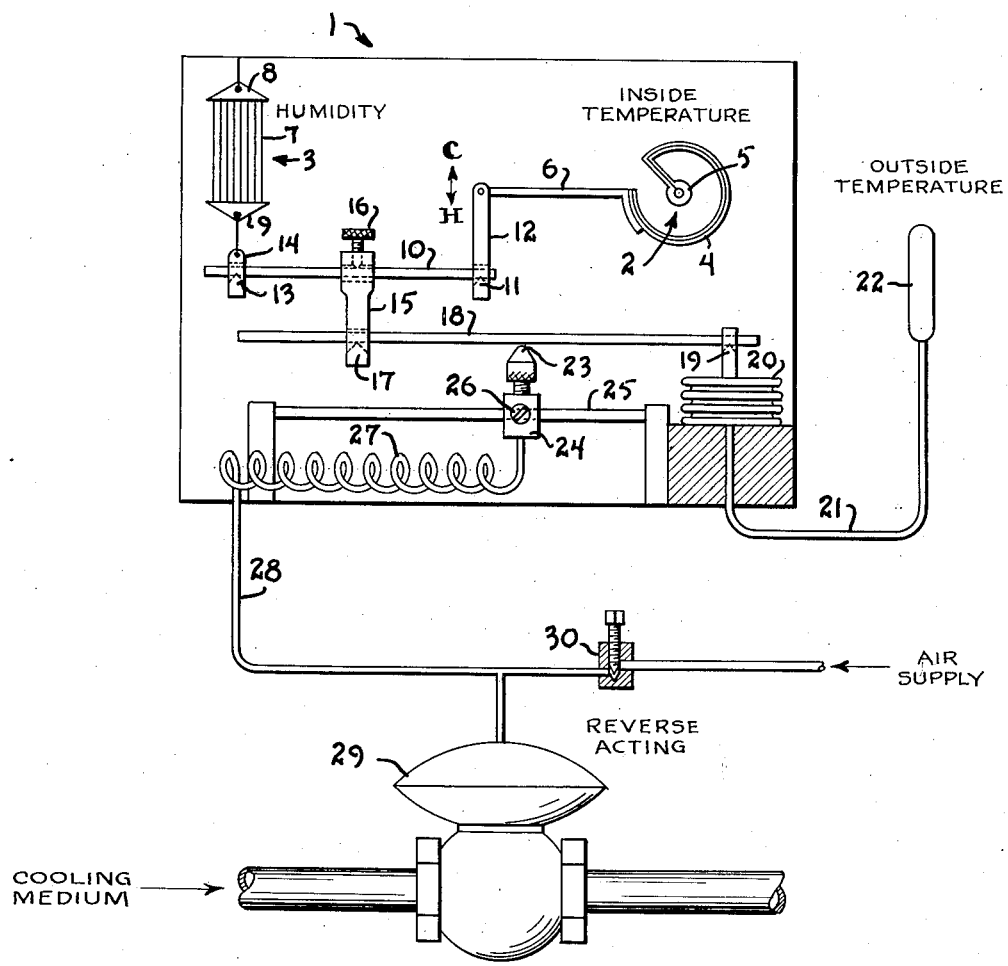
INVENTOR
Douglas H. Annin
BY
George H. Fisher
ATTORNEY

Patented Sept. 9, 1941

2,255,639

UNITED STATES PATENT OFFICE 2,255,639

CONDITION CONTROLLER

Douglas H. Annin, San Francisco, Calif., assignor to Minneapolis-Honeywell Regulator Company, Minneapolis, Minn., a corporation of Delaware Application December 3, 1937, Serial No. 177,918

5 Claims. (Cl. 236—44)

This invention relates to condition controllers and is more particularly concerned with condition controllers of the compensating type which are responsive to a plurality of conditions and are adapted to control in accordance with variations in such conditions.

In order to maintain proper comfort conditions within a conditioned space, it is necessary to vary the inside temperature in accordance with both changes in space, relative humidity and outside temperature. When the humidity within the conditioned space falls, the rate of evaporation of moisture from the occupants of the space increases, thereby causing the occupants to feel cooler even though the the dry bulb temperature has remained constant. Due to this effect, it is desirable to raise the standard of dry bulb temperature maintained in the space as the humidity decreases and to lower the standard of dry bulb temperature maintained as the humidity increases, to thereby compensate for the change in human comfort brought about by the change in humidity.

It is also desirable to change the temperature maintained in a space in accordance with changes in outdoor temperature. During the cooling season, it is necessary to raise the temperature maintained within a conditioned space as the outdoor temperature increases in order to avoid excessive shock to persons moving into and out of the conditioned space. Also, during the heating season, it is desirable to raise the temperature maintained within a space as the outside temperature decreases, in order to compensate for the increase in heat loss from the occupants due to increase in radiation of heat from the occupants to the colder outside walls.

It is an object of my invention to provide a compensating control device which is responsive to inside temperature, inside relative humidity, and outside temperature and which acts to vary the dry bulb temperature maintained in the space in accordance with humidity and outside temperature in a manner to maintain desired conditions within the space.

It is a further object of this invention to provide a condition controller of this type in which the compensating effect of the humidity and outside temperature may be varied as desired.

While my novel compensating condition controller is especially adapted to applications of the type above mentioned, its application is not limited thereto, and devices embodying the principles and parts of the invention may be applied to many different types of applications.

For a full disclosure of my invention, reference is made to the following detailed description and to the accompanying drawing, the single figure of which illustrates diagrammatically a condition controller embodying the principles of my invention.

Referring to the drawing, reference character 1 indicates generally the compensating control device which includes a dry bulb thermostat 2 and a humidity responsive device 3. The thermostat 2 may be of any desired construction and is herein illustrated as being of the bimetallic type including a circular bimetallic element 4 which is fixed at 5 and which carries an arm 6. The thermostat 2 in this particular device may be so arranged as to cause the arm 6 to be moved upwardly upon a fall in temperature and to be moved downwardly upon temperature rise.

Referring to the humidity controller 3, this controller may take any desired form and is herein shown as comprising a plurality of strands 7 of hair or other moisture responsive material, these strands being secured together by means of upper and lower clamping members 8 and 9. The upper clamping member 8 may be secured in any desired manner to a suitable fixed support. Upon an increase in relative humidity, the strands 7 will increase in length, thereby causing lowering of the lower clamping member 9. Upon a decrease in relative humidity, however, the strands 7 will shrink thereby causing the lower clamping member 9 to be raised.

Reference character 10 indicates a bar or movable member which is raised or lowered by the thermostat 2 and the humidity responsive device 3. The right-hand end of the movable member 10 may be supported by a knife edge 11 which is formed upon a link 12 which is pivotally secured to the arm 6 of the thermostat. The left-hand end of the movable member 10 may be supported by means of a knife edge 13 formed in a link 14 which is secured to the lower clamping member 9 of the humidity responsive device 3. From the description thus far, it should be apparent that variations in temperature will cause raising or lowering of the right-hand end of the movable member 10, while variations in relative humidity will cause raising or lowering of the left-hand end of said movable member.

Reference character 15 indicates an actuating member which is arranged for slidable support upon the movable member 10 and which is adapted to be held in position upon the member 10 by means of a set screw 16. The actuating member 15 is therefore adapted to be positioned at any point along the length of the movable member 10. It will be apparent that if the actuating member 15 is placed at the extreme right-hand end of the movable member, the movement of the movable member will be determined almost entirely by changes in temperature alone and changes in relative humidity will have but little effect upon the position of the actuating member 15. If, however, actuating member 15 is positioned at the extreme left-hand end of member 10, the vertical movement of the actuating member 15 will be determined almost entirely by changes in relative humidity. For intermediate positions of the actuating member 15 on the movable member 10, vertical movements of the actuating member 15 will be determined by changes in both temperature and relative humidity. Thus in order to increase the compensating effect of changes in relative humidity, the actuating member 15 may be shifted towards the humidity responsive device 3, and in order to decrease the compensating effect of humidity, the actuating member 15 may be shifted in the opposite direction.

The actuating member 15 is provided with a knife edge 17 which supports one end of a second movable member 18, the other end of this movable member 18 being supported upon a knife edge 19, which knife edge is formed in a member actuated by means of a bellows 20. The bellows 20 is connected by a capillary tube 21 to a control bulb 22 which may be located so as to respond to outdoor temperature. The bellows, tube and bulb contain a suitable volatile fluid thereby causing the bellows 20 to expand upon an increase in outside temperature and to contract upon a decrease in outside temperature.

The movable member 18 may form a valve member cooperating with a bleed port member 23. This member 23 may be mounted upon a slider 24 which is arranged for sliding on a track 25. This slider may be provided with a set screw 26 for holding the slider stationary at any desired position on the track 25. The bleed port of member 23 may be connected by a flexible tube 27 to an air conduit 28 which is connected to a pneumatic valve 29 and also to an air supply conduit through a restriction 30. The valve 29 forms no part of this invention and may be of any desired type which is adapted to assume various positions in accordance with the control pressure applied thereto. If the control device is applied to a cooling system, this valve would be of the "reverse acting type" which opens upon an increase in control pressure applied thereto. It will be apparent that as the movable member 18 is shifted from the bleed port 23, the rate of bleeding through this port will be increased thereby causing the pressure applied to the valve 29 to be decreased. Conversely, as the member 18 approaches the bleed port 23, the rate of bleeding will be reduced thereby causing the pressure applied to valve 29 to increase.

It will be apparent that the movable member 18 is positioned in accordance with the combined effect of the inside temperature, inside relative humidity, and outside temperature, the left-hand end of this movable member being moved up and down in accordance with changes in temperature and humidity (effective temperature), while the right-hand end of this member is moved up and down in accordance with changes in outdoor temperature. By shifting the slider 24 along the track 25, the compensating effect of the outside temperature may be varied. Thus if the slider 24 is positioned so that the bleed port 23 is adjacent the actuating member 15, changes in outdoor temperature will influence the rate of bleeding of air from the bleed port 23 only slightly. As the slider 24 is moved to the right across its track, however, the effect of the outside temperature upon the rate of bleeding from the port 23 will be increased. Consequently, the compensating effect of the outdoor temperature upon the control point of the instrument may be varied simply by shifting the position of the slider 24 on its track.

Referring to the operation of the device as a whole, when the inside temperature decreases the arm 6 of the thermostat will rise, thereby causing the right-hand end of the movable member 10 to be raised. This will, in turn, lift the actuating member 15 an amount determined by the position of this actuating member 15 upon the movable member 10. This raising of the actuating member 15 will, in turn, raise the left-hand end of the member 18, thereby causing the rate of bleed from the port 23 to be increased. This will, in turn, result in lowering of the pressure applied to valve 29. Due to valve 29 being of the reverse acting type which closes upon decrease in pressure applied thereto, this valve will close somewhat for reducing the flow of cooling medium to the space being cooled. Upon a rise in space temperature, opposite movement of the parts will take place, thereby causing the valve 29 to be moved towards open position for increasing the flow of cooling medium. For a constant relative humidity and outside temperature, it will be apparent that the inside thermostat 2 will act to maintain a substantially constant inside temperature.

If the relative humidity should decrease, the humidity responsive device will cause raising of the left-hand end of movable member 10, which in turn will cause raising of the left-hand end of movable member 18 an amount determined by the position of the actuating member 15 upon movable member 10. This raise of actuating member 15 will raise the left-hand end of the movable member 18 thereby increasing the rate of bleed through port 23 which will result in lowering the control pressure applied to valve 29. This lowering in pressure applied to valve 29 will cause the valve to close further and thereby decrease the flow of cooling medium to the space, which will allow the space temperature to rise. As the space temperature rises, the arm 6 of the thermostat 2 will lower which will result in moving the movable member 18 towards the bleed port 23 which will raise the pressure applied to valve 29 for increasing the flow of cooling medium to the space. Thus as the space temperature rises, the supply of cooling medium to the space is increased and consequently a new point of equilibrium at which the cooling medium supply balances the heat gain is reached, and consequently the temperature will remain constant at this new point. Therefore, a decrease in relative humidity will have the effect of causing the inside space temperature to be increased. This action will therefore compensate for the effect on human comfort of the decrease in relative humidity. By properly positioning the actuating member 15 on the movable member 10, the compensating effect of the relative humidity changes may be made just such as to maintain space conditions within the comfort zone.

If the outdoor temperature should increase, the resulting expansion of the bellows 20 will raise the right-hand end of the movable member 18. This will increase the rate of bleeding through port 23 thereby reducing the pressure applied to the valve 29 for causing this valve to restrict the supply of cooling medium to the space. This decrease in supply of cooling medium to the space will permit the space temperature to increase.

As the space temperature increases, arm 6 of the thermostat 2 will lower thereby causing lowering of the right-hand end of the movable member 10. At the same time, the relative humidity within the space will tend to decrease which will cause raising of the left-hand end of movable member 10. However, the effect on actuating member 15 of downward movement of the left-hand end of member 10 will be greater than the effect on said actuating member of the upward movement of the left-hand end of this member, and consequently as the space temperature increases the actuating member 15 will be lowered which causes the member 18 to approach the port 23. This will restrict the bleeding from port 23, thereby causing the pressure applied to valve 29 to be increased which will result in this valve opening further for increasing the amount of cooling medium supplied to the space. Thus as the space temperature rises, the amount of cooling medium supplied to the space is increased, and consequently a new point of equilibrium is reached at which the cooling effect balances the heat gain. Therefore, for an increase in outside temperature the space temperature will be raised. By varying the position of the slider 24 on the track 25, the amount by which the indoor temperature is raised for a rise in outdoor temperature may be varied to suit any desired schedule. It will be apparent that when the outdoor temperature decreases, the opposite action will take place thereby causing the inside temperature to fall.

From the foregoing description, it will be seen that I have provided a compensating control system which acts to maintain an effective temperature within a conditioned space as determined by outdoor temperature. While I have shown and described my invention as applied to a cooling system, this system may be readily applied to a heating system by reversing the effect of the outdoor temperature in a manner to cause the space temperature to be raised as the outdoor temperature drops, thus compensating for the effect of increased radiation from the occupants to the walls for maintaining a constant comfort condition within the space. This may conveniently be done by locating the bleed port member 23 on the left-hand side of the actuating member 15 instead of on the right-hand side thereof as shown in the drawing. Also, while the invention has been illustrated as comprising a controller which is responsive to inside temperature, relative humidity, and outside temperature, certain features of the invention are of broader application. I, therefore, desire to be limited only by the scope of the appended claims.

I claim as my invention:

1. In a compensating condition controller, in combination, a first condition responsive means, a first floating movable member, means for actuating one portion of said first movable member by said first condition responsive means, a second condition responsive means, means for actuating another portion of said first movable member by said second condition responsive means, a second floating movable member, actuating means actuated by said first movable member for actuating a portion of said second movable member, means for adjusting said actuating means in a manner to vary the relative effect of said first and second condition responsive means on said actuating means, a third condition responsive means, means actuated by said third condition responsive means for actuating another portion of said second movable member, and a control device actuated by said second movable member.

2. In a compensated effective temperature controller, in combination, a space temperature responsive thermostat, a space relative humidity responsive device, a floating movable member actuated by the conjoint action of said thermostat and said humidity responsive device, an actuating device actuated by said movable member, means for adjusting said actuating device in a manner to vary the relative effect of said thermostat and said humidity responsive device on said actuating device, an outdoor temperature responsive thermostat, a second floating movable member actuated by the conjoint action of said actuating device and said outdoor temperature responsive thermostat, a device controlled by said second member, and means for adjusting said device to be controlled with respect to said movable member.

3. In a compensating condition controller, in combination, an elongated actuating lever, first and second condition responsive control means operatively connected thereto adjacent the ends thereof, actuating means maintained at an intermediate point between the ends of said actuating lever, said actuating means being adjustable along said lever to vary the relative effect of said first and second control means upon said actuating means, a second elongated lever, a third condition responsive control means operatively connected thereto adjacent an end thereof, the other end thereof being operatively connected to said actuating means, and a device controlled by the movement of an intermediate point between the ends of said second lever.

4. In a compensated effective temperature controller, in combination, a space temperature responsive thermostat, a space relative humidity responsive device, a floating lever actuated by the conjoint action of said thermostat and said humidity responsive device, an actuating device mounted on said lever at an adjustable intermediate point between said thermostat and said humidity responsive device, an outdoor temperature responsive thermostat, a second floating lever actuated by the conjoint action of said actuating device and said outdoor temperature responsive thermostat, a device controlled by said second lever, and means for adjusting said device with respect to said second lever.

5. In a compensated effective temperature controller, in combination, a space temperature responsive thermostat, a space relative humidity responsive humidostat, a floating lever operatively connected at one end to said thermostat and at the other end to said humidostat, an actuating device mounted upon said lever between said thermostat and said humidostat, means for adjusting said actuating device in a manner to vary the relative effect of said thermostat and said humidostat, an outdoor temperature responsive thermostat, a second floating lever operatively connected at one end to said outdoor temperature responsive thermostat and longitudinally adjustably connected to said actuating device at the other end, a device controlled by said second lever, and means for adjusting said device in a manner to vary the relative effect of said actuating device and said outdoor temperature responsive thermostat.

DOUGLAS H. ANNIN.